United States Patent
Peng et al.

(10) Patent No.: US 10,248,547 B2
(45) Date of Patent: Apr. 2, 2019

(54) COVERAGE OF CALL GRAPHS BASED ON PATHS AND SEQUENCES

(71) Applicant: SAP SE, Walldorf (DE)

(72) Inventors: Yang Peng, Shanghai (CN); Yunfeng Jiang, Shanghai (CN); Junshan Xu, Shanghai (CN); Yueling Wang, Shanghai (CN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 15/490,482

(22) Filed: Apr. 18, 2017

(65) Prior Publication Data
US 2018/0300224 A1    Oct. 18, 2018

(51) Int. Cl.
*G06F 11/36* (2006.01)

(52) U.S. Cl.
CPC ........ *G06F 11/3676* (2013.01); *G06F 11/368* (2013.01)

(58) Field of Classification Search
CPC ...... G06F 11/34; G06F 11/3466; G06F 11/36; G06F 11/3604; G06F 11/3608; G06F 11/3612; G06F 11/362; G06F 11/3636; G06F 11/364; G06F 11/3672; G06F 11/3676; G06F 11/368
See application file for complete search history.

(56) References Cited

U.S. PATENT DOCUMENTS

| | | | |
|---|---|---|---|
| 7,167,870 B2 * | 1/2007 | Avvari | G06F 11/3676 707/609 |
| 10,102,111 B2 * | 10/2018 | Rajagopalan | G06F 11/3672 |
| 2003/0212661 A1 * | 11/2003 | Avvari | G06F 11/3676 |
| 2006/0168565 A1 * | 7/2006 | Gamma | G06F 11/3688 717/122 |
| 2018/0039567 A1 * | 2/2018 | Rajagopalan | G06F 11/3672 |
| 2018/0039570 A1 * | 2/2018 | Rajagopalan | G06F 11/3636 |

* cited by examiner

*Primary Examiner* — Emerson C Puente
*Assistant Examiner* — Erika Kretzmer
(74) *Attorney, Agent, or Firm* — Fountainhead Law Group P.C.

(57) ABSTRACT

Some embodiments provide a program that collects a set of call stack data associated with a set of test cases executed on an application. The program further generates a set of call graphs based on the set of call stack data. Each call graph in the set of call graphs includes a set of nodes representing a set of functions in the application executed in the corresponding test case in the set of test cases. The program also determines, for each call graph in the set of call graphs, a set of short paths and a set of short sequences in the call graph. The program further receives a notification indicating a modification to a function in the application. The program also determines a subset of the set of test cases to test the modification to the function based on the sets of short paths and the sets of short sequences in the set of call graphs.

20 Claims, 14 Drawing Sheets

500

Call Stack Data for Test Case 4:
A()
　B()
　　D()
　　　H()
　　　　M()
　　C()
　　　F()
　　　　K()
　　　　　O()

Short Paths:
AB, BD, BE, EF, FKOP, DIN, EIN

Short Sequences:
BDE, EFI

COVERAGE OF CALL GRAPHS BASED ON PATHS AND SEQUENCES

BACKGROUND

In the computer technology world today, computer software is constantly being created, developed, and released for use by a number of different computing devices. Often, software testing may be utilized to discover bugs in computer software and determine whether the computer software is ready to be released for use. Many different types of testing methods may be used in software testing. For example, one type of testing method is static testing, which may include performing source code reviews, software walkthroughs, software inspections, etc. Another type of testing method is dynamic testing which may include executing programmed code with one or more test cases.

SUMMARY

In some embodiments, a non-transitory machine-readable medium stores a program. The program collects a set of call stack data associated with a set of test cases executed on an application. The program further generates a set of call graphs based on the set of call stack data. Each call graph in the set of call graphs includes a set of nodes representing a set of functions in the application executed in the corresponding test case in the set of test cases. The program also determines, for each call graph in the set of call graphs, a set of short paths and a set of short sequences in the call graph. The program further receives a notification indicating a modification to a function in the application. The program also determines a subset of the set of test cases to test the modification to the function based on the sets of short paths and the sets of short sequences in the set of call graphs.

In some embodiments, the program may further generate a full call graph based on the set of call graphs. The full call graph may include a plurality of nodes representing the sets of functions executed in the set of test cases. The program may also determine a set of switch nodes and a set of edge nodes in the plurality of nodes of the full call graph. Determining, for each call graph in the set of call graphs, the set of short paths and the set of short sequences in the call graph may be based on the set of switch nodes and the set of edge nodes of the full call graph. A switch node may be a node in a call graph representing a function that calls a plurality of other functions. An edge node may be a node in a call graph representing a function that is called by at least one other function and that does not call any functions. A short path may be a path in a call graph comprising a switch node as a first node in the path and a switch node or an edge node as a last node in the path. A short sequence may be a set of nodes in a call graph comprising a switch node and one or more nodes that the switch node calls.

In some embodiments, a method collects a set of call stack data associated with a set of test cases executed on an application. The method further generates a set of call graphs based on the set of call stack data. Each call graph in the set of call graphs comprising a set of nodes representing a set of functions in the application executed in the corresponding test case in the set of test cases. The method also determines, for each call graph in the set of call graphs, a set of short paths and a set of short sequences in the call graph. The method further receives a notification indicating a modification to a function in the application. The method also determines a subset of the set of test cases to test the modification to the function based on the sets of short paths and the sets of short sequences in the set of call graphs.

In some embodiments, the method may further generate a full call graph based on the set of call graphs. The full call graph may include a plurality of nodes representing the sets of functions executed in the set of test cases. The method may also determine a set of switch nodes and a set of edge nodes in the plurality of nodes of the full call graph. Determining, for each call graph in the set of call graphs, the set of short paths and the set of short sequences in the call graph may be based on the set of switch nodes and the set of edge nodes of the full call graph. A switch node may be a node in a call graph representing a function that calls a plurality of other functions. An edge node may be a node in a call graph representing a function that is called by at least one other function and that does not call any functions. A short path may be a path in a call graph comprising a switch node as a first node in the path and a switch node or an edge node as a last node in the path. A short sequence may be a set of nodes in a call graph comprising a switch node and one or more nodes that the switch node calls.

In some embodiments, a system includes a set of processing units and a non-transitory computer-readable medium that stores instructions. The instructions cause at least one processing unit to collect a set of call stack data associated with a set of test cases executed on an application. The instructions further cause the at least one processing unit to generate a set of call graphs based on the set of call stack data. Each call graph in the set of call graphs comprising a set of nodes representing a set of functions in the application executed in the corresponding test case in the set of test cases. The instructions also cause the at least one processing unit to determine, for each call graph in the set of call graphs, a set of short paths and a set of short sequences in the call graph. The instructions further cause the at least one processing unit to receive a notification indicating a modification to a function in the application. The instructions also cause the at least one processing unit to determine a subset of the set of test cases to test the modification to the function based on the sets of short paths and the sets of short sequences in the set of call graphs.

In some embodiments, the instructions may further cause the at least one processing unit to generate a full call graph based on the set of call graphs. The full call graph may include a plurality of nodes representing the sets of functions executed in the set of test cases. The instructions may also cause the at least one processing unit to determine a set of switch nodes and a set of edge nodes in the plurality of nodes of the full call graph. Determining, for each call graph in the set of call graphs, the set of short paths and the set of short sequences in the call graph may be based on the set of switch nodes and the set of edge nodes of the full call graph. A switch node may be a node in a call graph representing a function that calls a plurality of other functions. An edge node may be a node in a call graph representing a function that is called by at least one other function and that does not call any functions. A short path is a path in a call graph may include a switch node as a first node in the path and a switch node or an edge node as a last node in the path. A short sequence may be a set of nodes in a call graph comprising a switch node and one or more nodes that the switch node calls.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system configured to determine coverage of call graphs of test cases. In some embodiments, the system collects method/function invocation history (e.g., call stack data) of several test cases executed on an application operating in the system. The system may generate call graphs for the test cases based on the method/function invocation history the test cases. Next, the system can generate a full call graph based on the generated call graphs. In some instances, a method/function used in one or more of the test cases may be modified. The system may include a feature for identifying a minimum set of test cases to execute to test the impact of the modification of the method/function on the operation of the application.

Figure 1:
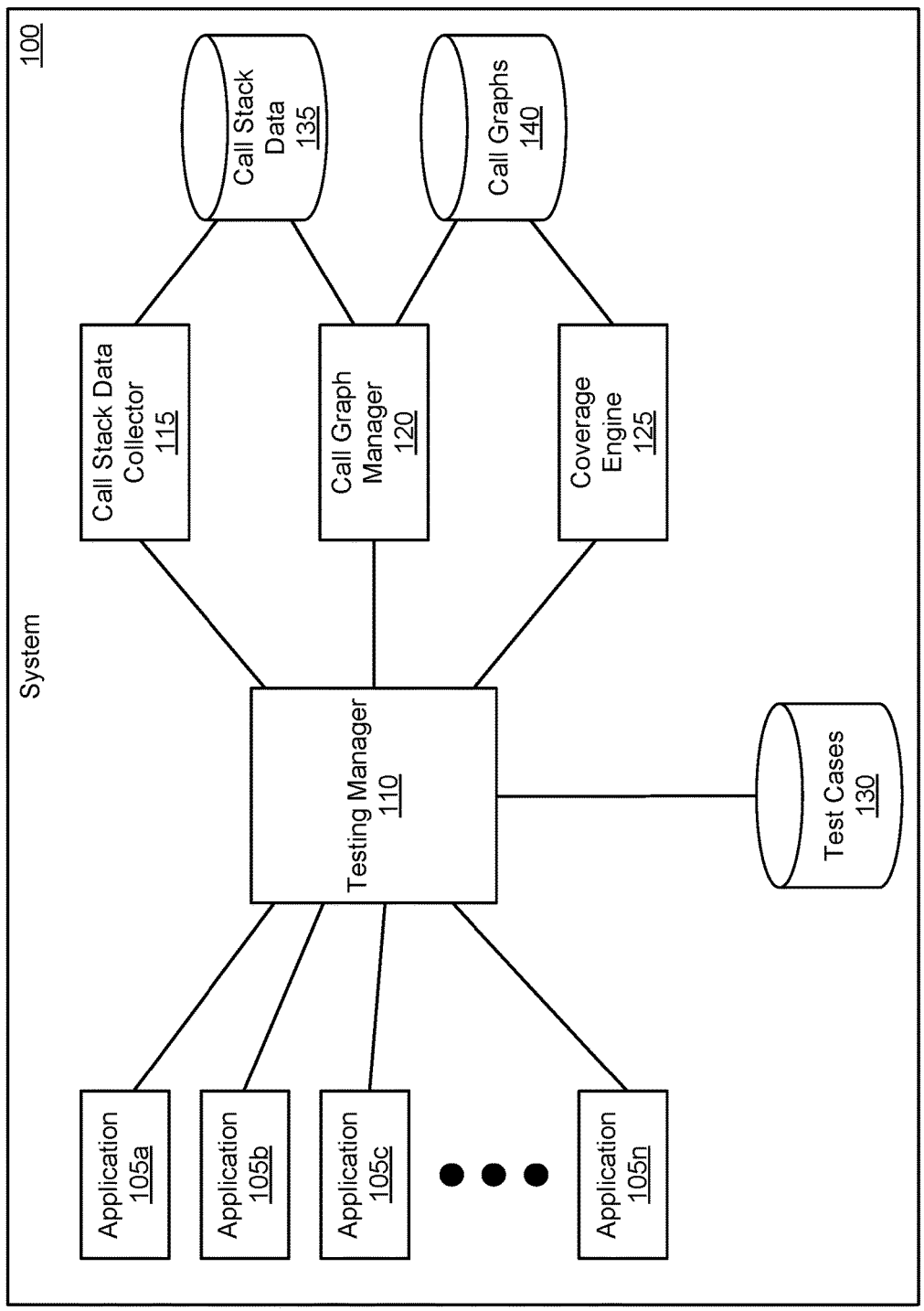
FIG. 1 illustrates a system according to some embodiments.

FIG. 1 illustrates a system 100 according to some embodiments. As shown, system 100 includes applications 105a-n, testing manager 110, call stack data collector 115, call graph manager 120, coverage engine 125, and storages 130-140. Applications 105a-n are software applications/programs that each includes instructions for performing a set of tasks when executed by a computing device. In some embodiments, each of applications 105a-n may include and/or refer to one or more functions in order to perform the set of tasks. During operation of an application 105, the application 105 may call any of the one or more functions. In addition, the application 105 can call one function, which in turn can call another function, which in turn can call yet another function, and so on and so forth.

Test cases storage 130 is configured to store test cases for performing tests on applications 105a-n. In some embodiments, a test case may include a set of commands, scripts, etc. for operating an application 105 and/or configuration data for configuring a testing tool to operate the application 105. Test cases may be performed in an automated manner without human intervention. Call stack data storage 135 is configured to store call stack data associated with the operation of applications 105a-n. In some embodiments, call stack data associated with an application 105 may include a sequence of functions calls performed during the operation of the application 105. Call graphs 140 is configured to store call graphs of call stack data. In some embodiments, a call graph of call stack data associated with an application 105 includes a set of nodes representing a set of functions executed during the operation of the application 105 and relationships between the set of functions.

Storages 130-140 may be relational databases, non-relational databases (e.g., document-oriented databases, key-value databases, column-oriented databases, etc.), or a combination thereof. In some embodiments, storages 130-140 are implemented in a single physical storage while, in other embodiments, storages 130-140 may be implemented across several physical storages. While FIG. 1 shows storages 130-140 as part of system 100, one of ordinary skill in the art will appreciated that storages 130, 135, and/or 140 may be external to system 100 in some embodiments.

Testing manager 110 is responsible for managing the testing of applications 105a-n. For example, testing manager 110 may receive a request to perform tests on an application 105. In response, testing manager 110 retrieves a set of test cases associated with the application 105 (e.g., a set of test cases having an application identifier associated with the application 105) from test cases storage 130. Next, testing manager 110 instructs call stack data collector 115 to start collecting call stack data while testing manager 110 executes a test case in the set of test cases on the application 105. Once, testing manager 110 finishes executing the test case in the set of test cases on the application 105, testing manager 110 instructs call stack data collector 115 to stop collecting call stack data. Testing manager 110 instructs call stack data collector 115 to start and stop collecting call stack data for each of the remaining test cases in the set of test cases. Testing manager 110 then instructs call graph manager 120 to generate a set of call graphs associated with the set of test cases as well as a full call graph of the set of call graphs associated with the set of test cases.

Call stack data collector 115 is configured to collect call stack data of an application 105 when the application 105 is executing. For instance, call stack data collector 115 may receive a request from testing manager 110 to start collecting call stack data for a test case executing on an application 105. In response, call stack data collector 115 begins collecting call stack data for the application 105. Upon receiving a request from testing manager 110 to stop collecting call stack data for the test case executing on the application 105, call stack data collector 115 stops collecting call stack data for the application 105 and then stores the collected call stack data in call stack data storage 135.

Call graph manager 120 handles managing call graphs. As mentioned above, a call graph includes a set of nodes representing a set of functions executed during the operation of an application 105 and relationships between the set of functions. When call graph manager 120 receives a request from testing manager 110 to generate a call graph of call stack data associated with a test case executed on an application 105, call graph manager 120 accesses call stack data storage 135 and retrieves the call stack data associated with the test case executed on the application 105. Call graph manager 120 then generates a call graph for the test case on the application 105 based on the retrieved call stack data and stores the call graph in call graphs storage 140.

Figure 2:
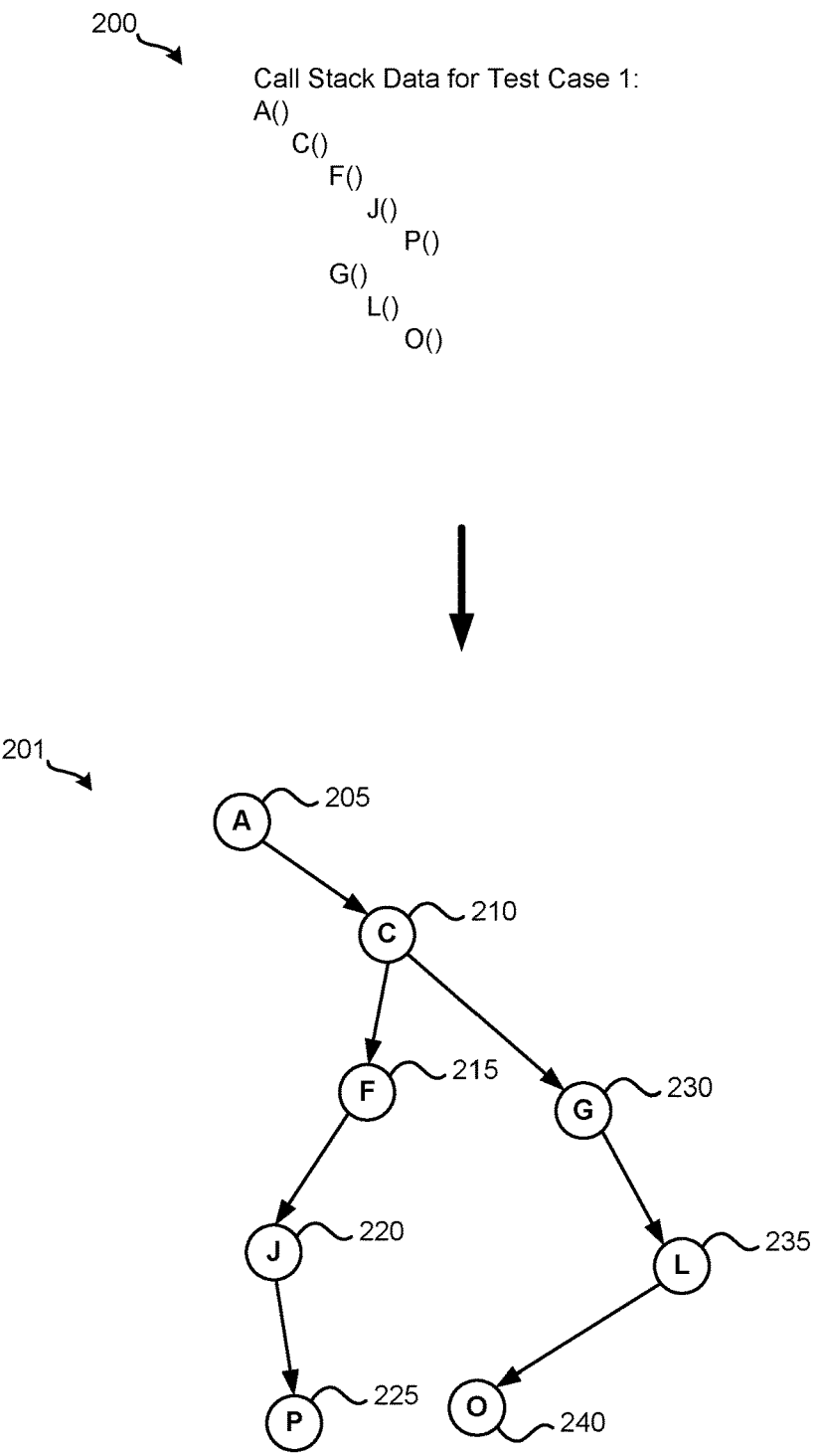
FIG. 2 illustrates an example set of call stack data associated with the execution of a test case and a corresponding call graph according to some embodiments.

FIGS. 2-5 illustrate example call stack data and corresponding call graphs according to some embodiments. Specifically, FIGS. 2-5 illustrate four sets of call stack data associated with the execution of four test cases on an application and four call graphs generated based on the sets of call stack data. FIG. 2 illustrates an example set of call stack data 200 associated with the execution of a test case and a corresponding call graph 201 according to some embodiments. In some embodiments, call stack data collector 115 collects the set of call stack data 200 during the execution of a test case on an application 105 and stores the set of call stack data 200 in call stack data storage 135. In addition, call graph manager 120 generates call graph 201 based on the set of call stack data 200 in some such embodiments.

In this example, the set of call stack data 200 is associated with the execution of Test Case 1. As shown, the set of call stack data 200 includes a call to function A, which calls function C, which calls function F, which calls function J, which calls function P. Function C also calls function G, which calls function L, which calls function O. For this example, call graph 201 is generated based on the set of call stack data 200. As illustrated, call graph 201 includes nodes 205-240. Node 205 represents function A, node 210 represents function C, node 215 represents function F, node 220 represents function J, node 225 represents function P, node 230 represents function G, node 235 represents function L, and node 240 represents function O. Call graph 201 shows the relationships between the functions represented by nodes 205-240. Specifically, function A calls function C, which calls both functions F and G. Function F calls function J, which calls function P. Function G calls function L, which calls function O.

Figure 3:
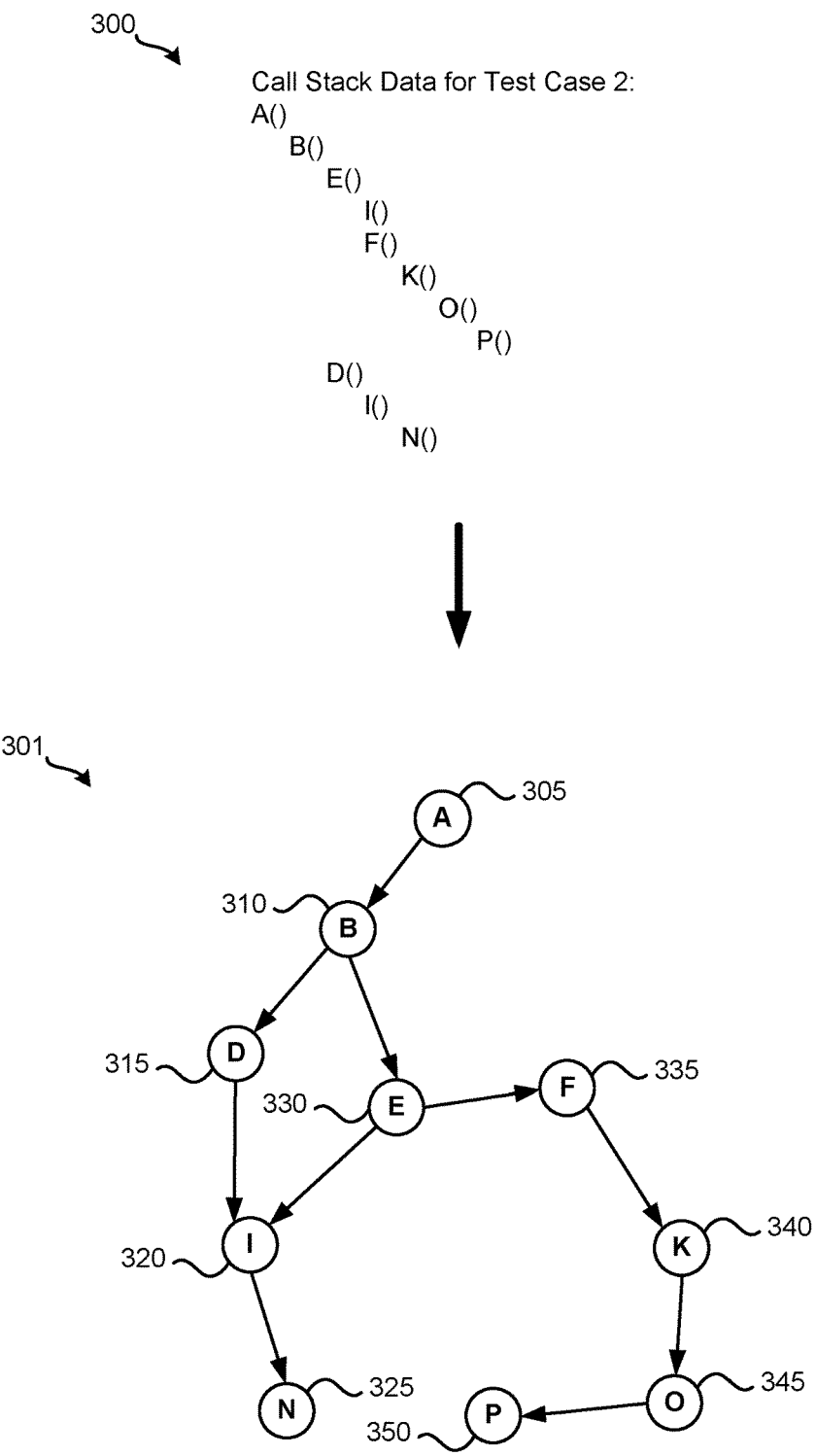
FIG. 3 illustrates an example set of call stack data associated with the execution of another test case and a corresponding call graph according to some embodiments.

FIG. 3 illustrates an example set of call stack data 300 associated with the execution of another test case and a corresponding call graph 301 according to some embodiments. In some embodiments, call stack data collector 115 collects the set of call stack data 300 during the execution of a test case on an application 105 and stores the set of call stack data 300 in call stack data storage 135. In addition, call graph manager 120 generates call graph 301 based on the set of call stack data 300 in some such embodiments.

For this example, the set of call stack data 300 is associated with the execution of Test Case 2. As illustrated, the set of call stack data 300 includes a call to function A, which calls function B, which calls function E, which calls function I. Function E also calls function F, which calls function K, which calls function O, which calls function P. In addition, function B calls function D, which calls function I, which calls function N. In this example, call graph 301 is generated based on the set of call stack data 300. As shown, call graph 301 includes nodes 305-350. Node 305 represents function A, node 310 represents function B, node 315 represents function D, node 320 represents function I, node 325 represents function N, node 330 represents function E, node 335 represents function F, node 340 represents function K, node 345 represents function O, and node 350 represents function P. Call graph 301 shows the relationships between the functions represented by nodes 305-350. In particular, function A calls function B, which calls both functions D and E. Functions D and E both call function I, which calls function N. Function E also call F, which calls function K, which calls function O, which calls function P.

Figure 4:
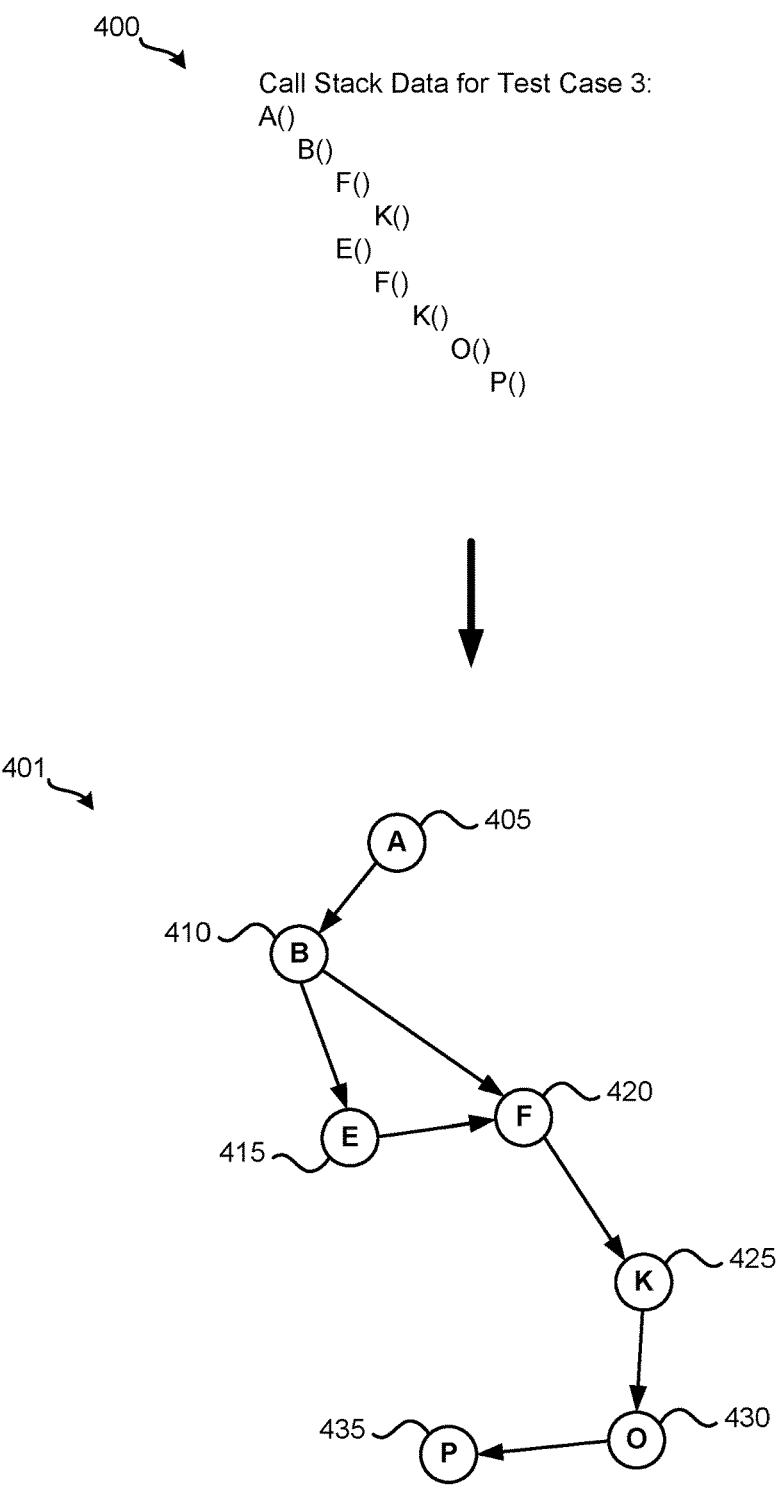
FIG. 4 illustrates an example set of call stack data associated with the execution of another test case and a corresponding call graph according to some embodiments.

FIG. 4 illustrates an example set of call stack data 400 associated with the execution of another test case and a corresponding call graph 401 according to some embodiments. In some embodiments, call stack data collector 115 collects the set of call stack data 400 during the execution of a test case on an application 105 and stores the set of call stack data 400 in call stack data storage 135. In addition, call graph manager 120 generates call graph 401 based on the set of call stack data 400 in some such embodiments.

In this example, the set of call stack data 400 is associated with the execution of Test Case 3. As shown, the set of call stack data 400 includes a call to function A, which calls function B, which calls function F, which calls function K. Function B also calls function E, which calls function F, which calls function K, which calls function O, which calls function P. For this example, call graph 401 is generated based on the set of call stack data 400. As illustrated, call graph 401 includes nodes 405-435. Node 405 represents function A, node 410 represents function B, node 415 represents function E, node 420 represents function F, node 425 represents function K, node 430 represents function O, and node 435 represents function P. Call graph 401 shows the relationships between the functions represented by nodes 405-435. Specifically, function A calls function B, which calls both functions E and F. Function F calls function K, which calls function O, which calls function P.

Figure 5:
FIG. 5 illustrates an example set of call stack data associated with the execution of another test case and a corresponding call graph according to some embodiments.
Figure 5:
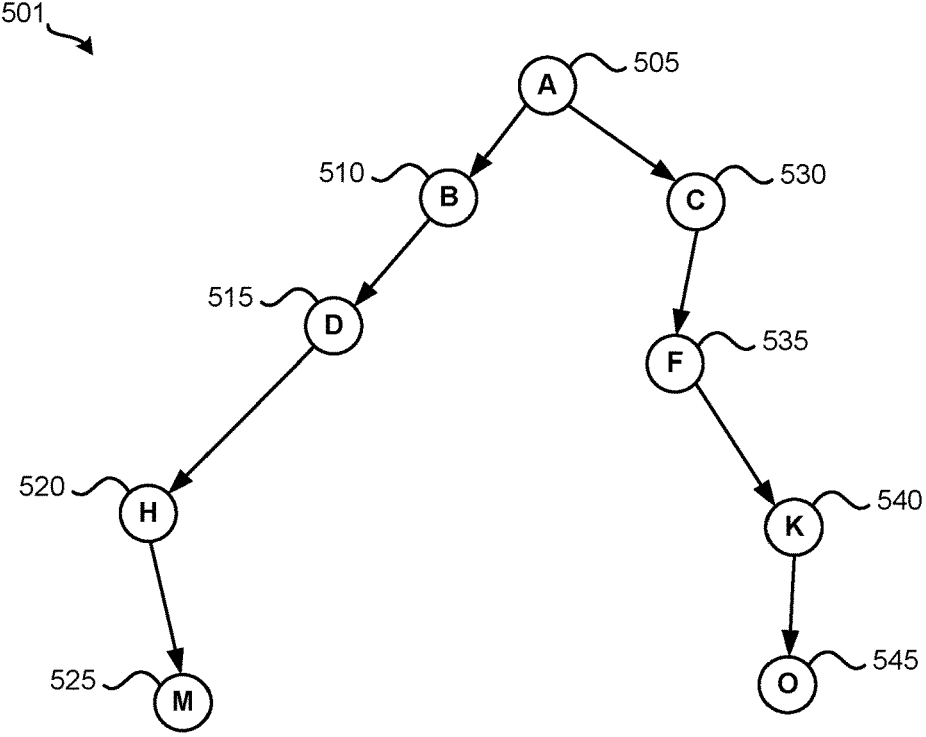

FIG. 5 illustrates an example set of call stack data 500 associated with the execution of another test case and a corresponding call graph 501 according to some embodiments. In some embodiments, call stack data collector 115 collects the set of call stack data 500 during the execution of a test case on an application 105 and stores the set of call stack data 500 in call stack data storage 135. In addition, call graph manager 120 generates call graph 501 based on the set of call stack data 500 in some such embodiments.

For this example, the set of call stack data 500 is associated with the execution of Test Case 4. As illustrated, the set of call stack data 500 includes a call to function A, which calls function B, which calls function D, which calls function H. Function D also calls function M. In addition, function B calls function C, which calls function F, which calls function K, which calls function O. In this example, call graph 501 is generated based on the set of call stack data 500. As shown, call graph 501 includes nodes 505-545. Node 505 represents function A, node 510 represents function B, node 515 represents function D, node 520 represents function H, node 525 represents function M, node 530 represents function C, node 535 represents function F, node 540 represents function K, and node 545 represents function O. Call graph 501 shows the relationships between the functions represented by nodes 505-545. In particular, function A calls both functions B and C. Function B calls function D, which calls function H, which calls function M. Functions C calls function F, which calls function K, which calls function O.

Returning to FIG. 1, in addition to receiving requests to generate call graphs associated with test cases executed on applications 105, call graph manager 120 may also receive requests to generate full call graphs based on call graphs associated with test cases executed on applications 105. In some embodiments, a full call graph is a call graph that combines the nodes and relationships of a several call graphs. For example, a full call graph of several call graphs associated with test cases executed on an application 105 includes the nodes and relationships in the several call graphs. When call graph manager 120 receives a request from testing manager 110 to generate a full call graph of call graphs associated with several test cases executed on an application 105, call graph manager 120 accesses call graph storage 140 and retrieves the call graphs associated with the several test case executed on the application 105. Call graph manager 120 then generates a full call graph of the call graphs associated with the several test cases executed on the application 105.

Figure 6A:
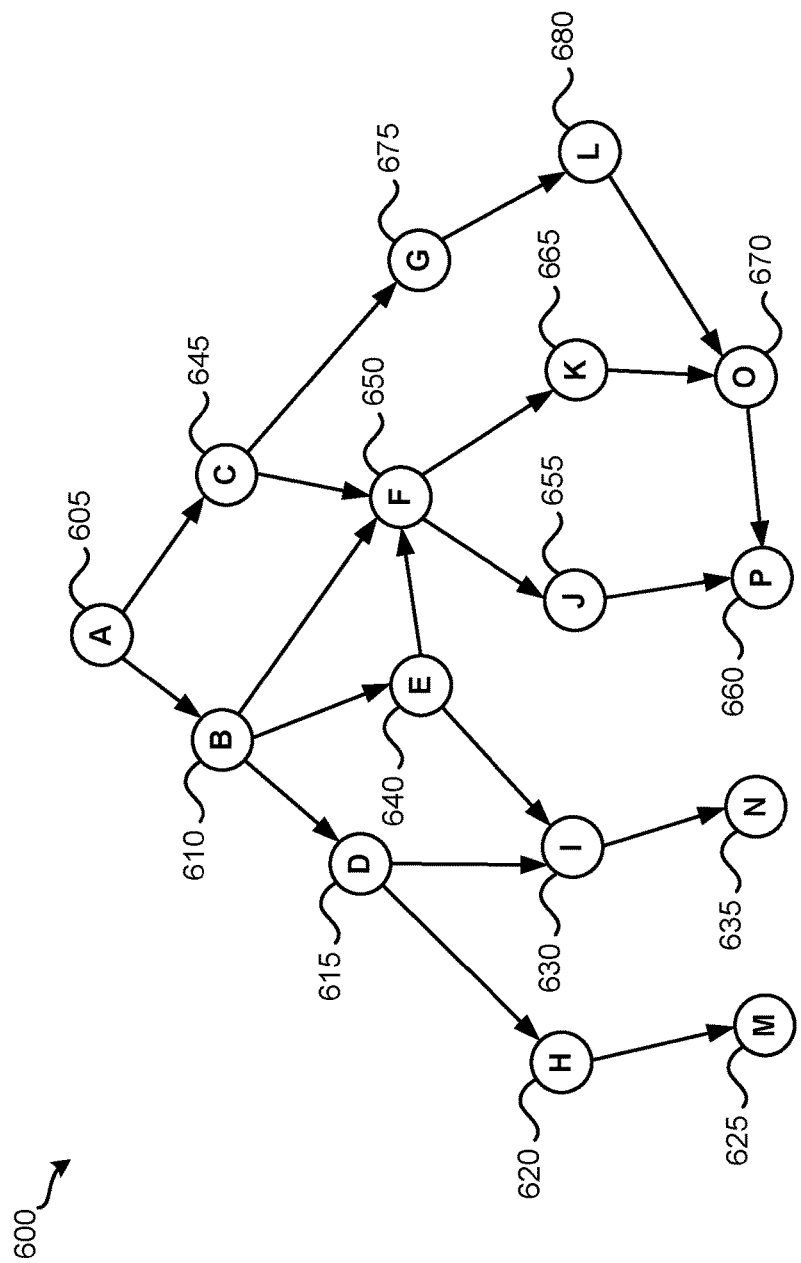
FIGS. 6A and 6B illustrate an example full call graph according to some embodiments.
Figure 6B:
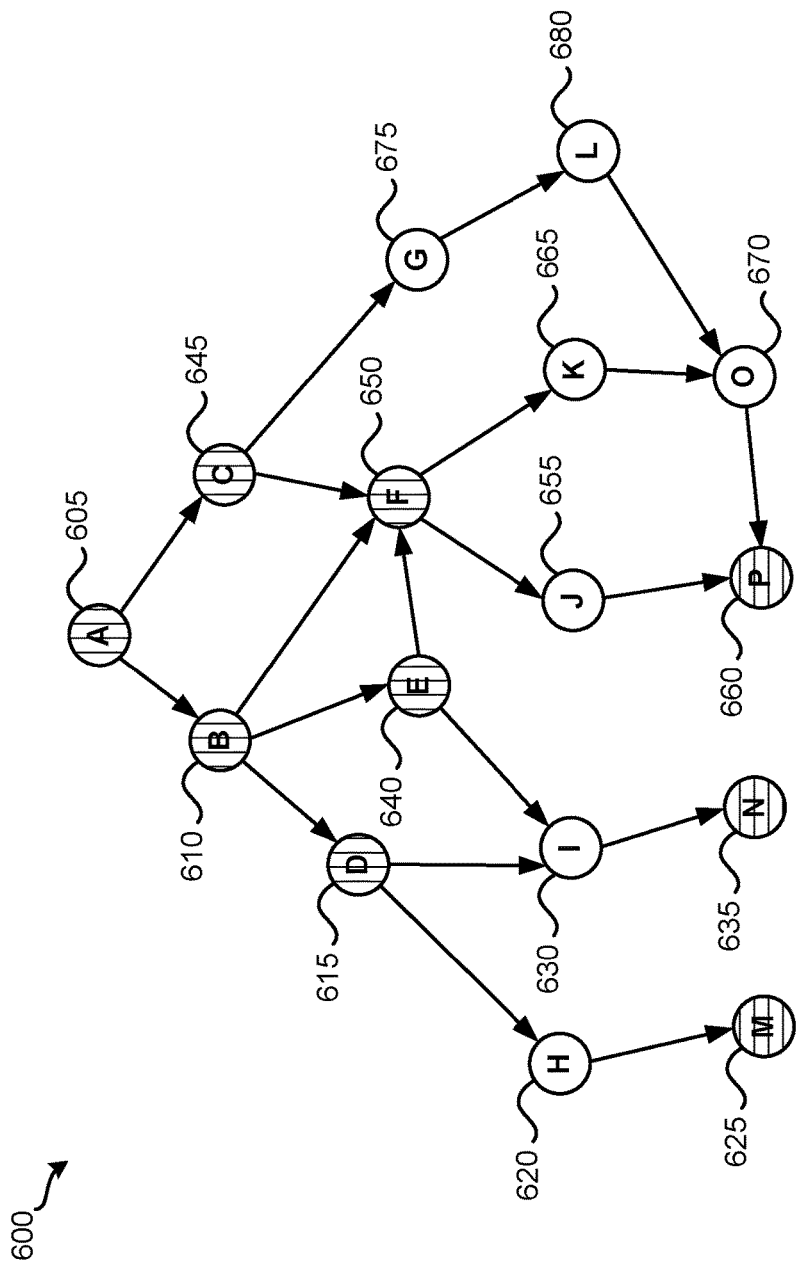

FIGS. 6A and 6B illustrate an example full call graph according to some embodiments. Specifically, FIG. 6A illustrates full call graph 600 generated based on the call graphs illustrated in FIGS. 2-5. As shown in FIG. 6A, full call graph 600 includes nodes 605-680, which is a combination of the nodes of call graphs 201, 301, 401, and 501. Node 605 represents function A, node 610 represents function B, node 615 represents function D, node 620 represents function H, node 625 represents function M, node 630 represents function I, node 635 represents function N, node 640 represents function E, node 645 represents function, node 650 represents function F, node 655 represents function J, node 660 represents function P, node 665 represents function K, node 670 represents function O, node 675 represents function G, and node 680 represents function L.

As illustrated in FIG. 6A, full call graph 600 also combines the relationships between the functions represented by the nodes of call graphs 201, 301, 401, and 501. In particular, function A calls both functions B and C. B calls three functions D, E, and F. Function D calls both functions H and I. Function H calls function M while function I calls function N. Function E calls both functions I and F. Function I calls function N. Function C calls functions F and G. Function F calls both functions J and K. Function J calls function P. Function K calls function O, which calls function P. Function G calls function L, which calls function O, which calls function P.

Returning to FIG. 1, once call graph manager 120 generates a full call graph, call graph manager 120 determines the switch nodes and the edge nodes in the full call graph. In some embodiments, a switch node is a node that calls two or more functions and an edge node is a node that does not call any functions. After determining the switch nodes and edge nodes in the full call graph, call graph manager 120 stores the full call graph in call graphs storage 140. FIG. 6B illustrates switch nodes and edge nodes in full call graph 600. As illustrated in FIG. 6B, nodes 605, 610, 615, 640, 645, and 650 are determined to be switch nodes, as indicated by a vertical striping of these nodes, since each of nodes 605, 610, 615, 640, 645, and 650 calls two or more functions. Nodes 625, 635, and 660 are determined to be edge nodes, as indicated by a horizontal striping of these nodes, because each of nodes 625, 635, and 660 do not call any functions. Nodes 620, 630, 655, 665, 670, 675, and 680 are determined to be neither switch nodes nor edge nodes as these nodes each call one function.

Returning to FIG. 1, as described above, testing manager 110 may perform test cases on applications 105. For a given set of test cases executed on an application 105, testing manager 110 may handle determining a subset of the set of test cases (e.g., a minimum number of the set of test cases) that provides sufficient coverage of a function in the set of test cases. For instance, testing manager 110 may receive a message indicating that a function in an application 105 on which a set of test cases was executed has been modified along with a request to determine a subset of the set of test cases that provides sufficient coverage of the modified function in the set of test cases. Upon receiving such a request, testing manager 110 instructs coverage engine 125 to determine the subset of the set of test cases that provides sufficient coverage of the modified function in the set of test cases. When testing manager 110 receives the subset of the set of test cases from coverage engine 125, testing manager 110 executes the subset of the set of test cases on a version of the application 105 that includes the modified function in order to determine the impact of the modified function on the operation of the application 105.

Coverage engine 125 is configured to process requests for a subset of a set of test cases (e.g., a minimum number of the set of test cases) executed on an application 105 that provides sufficient coverage of a function in the set of test cases. For example, coverage engine 125 may receive such a request from testing manager 110. In response, coverage engine 125 retrieves from call graphs storage 140 a set of call graphs associated with the set of test cases along with a full call graph of the set of call graphs associated with the set of test cases.

For each call graph in the set of call graphs associated with the set of test cases, coverage engine 125 divides the call graph into a set of short paths based on the determined switch nodes and edge nodes in the full call graph. In some embodiments, a short path of a call graph is a path in a call graph that starts at a switch node and ends at another switch node in the path, an edge node in the path, or a node that is neither a switch node nor an edge node in the path. In addition, coverage engine 125 determines, for each call graph in the set of call graphs associated with the set of test cases, a set of short sequences in the call graph. In some embodiments, a short sequence of a call graph is a set of nodes in the call graph that includes a switch node and one or more nodes that the switch node calls. In some embodiments, coverage engine 125 may perform a reduction operation that removes short sequences from the set of short sequences of a call graph that are subpaths of short paths in the set of short paths.

Figure 7:
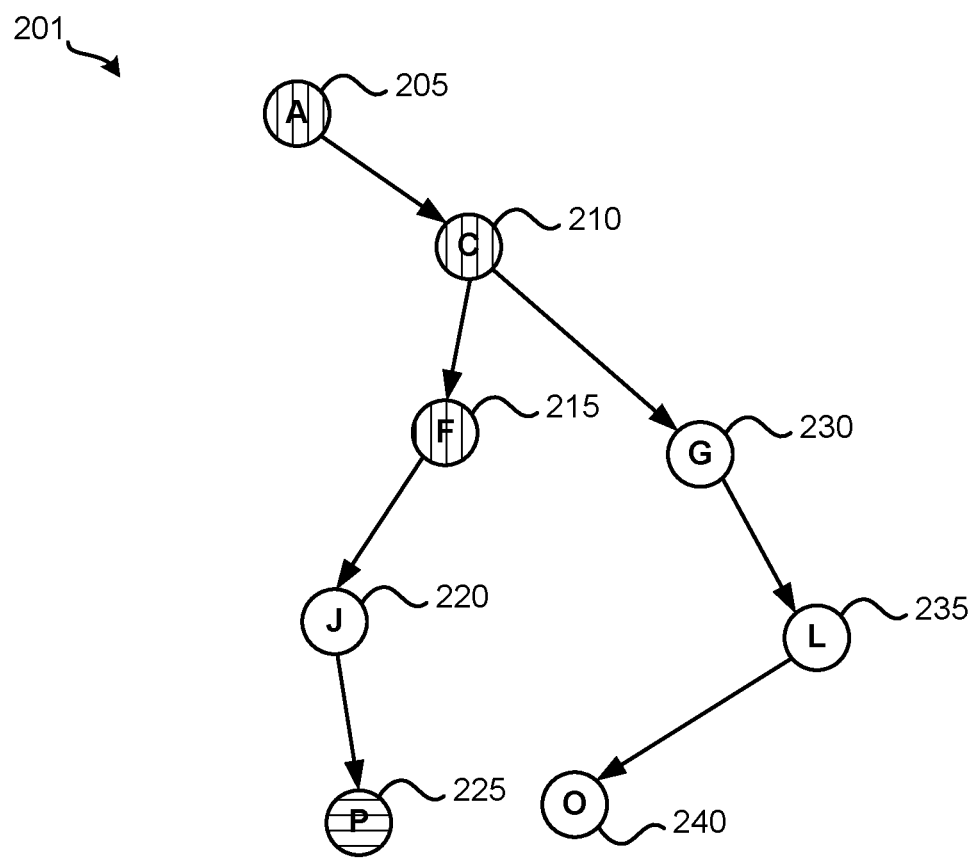
FIG. 7 illustrates short paths and short sequences for the call graph illustrated in FIG. 2 according to some embodiments.
Figure 8:
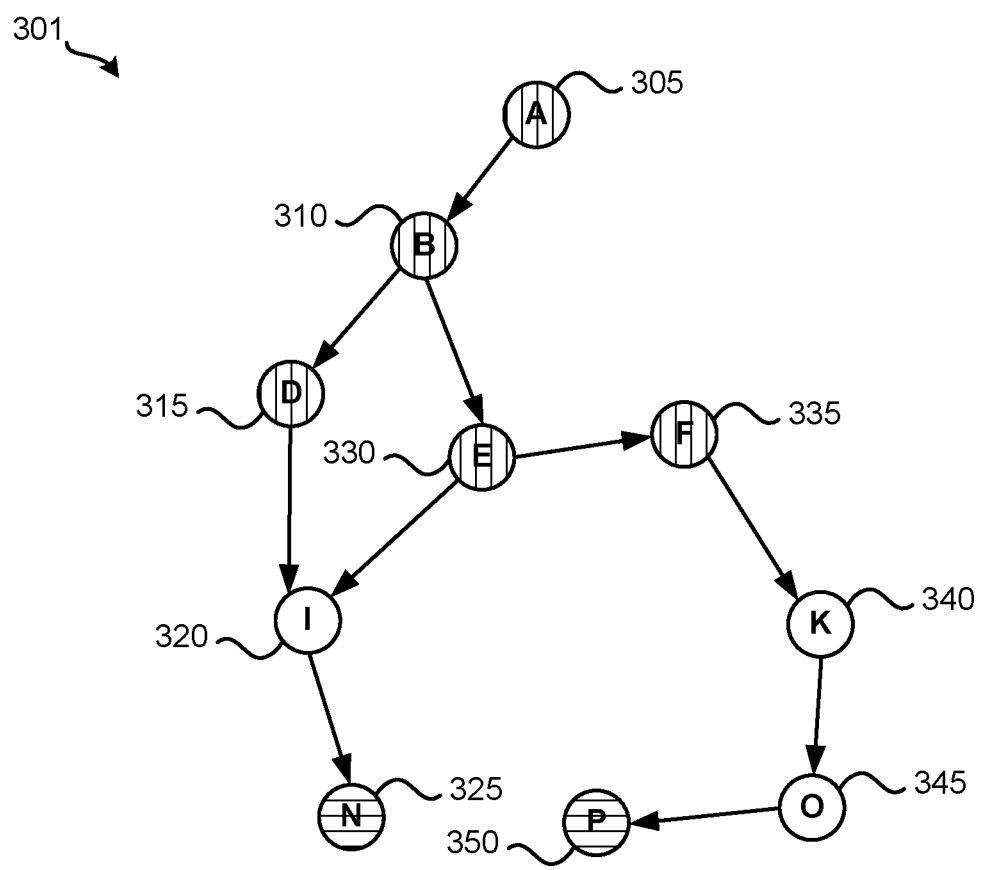
FIG. 8 illustrates short paths and short sequences for the call graph illustrated in FIG. 3 according to some embodiments.

FIG. 7 illustrates short paths and short sequences for the call graph illustrated in FIG. 2 according to some embodiments. As shown, call graph 201 is divided into short paths AC, CF, FJP, and CGLO. The short sequences for call graph 201 include a first set of nodes AC (nodes 205 and 210), a second set of nodes CFG (nodes 210, 215, and 230), and a third set of nodes FJ (nodes 215 and 220). In this example, a reduction operation is performed that removes short sequences AC and FJ from the set of short sequences since short sequences AC and FJ are subpaths of the short paths AC and FJP, respectively, in the set of short paths. FIG. 8 illustrates short paths and short sequences for the call graph illustrated in FIG. 3 according to some embodiments. As illustrated, call graph 301 is divided into short paths AB, BD, BE, EF, FKOP, DIN, and EIN. The short sequences for call graph 301 include a first set of nodes AB (nodes 305 and 310), a second set of nodes BDE (nodes 310, 315, and 330), a third set of nodes EFI (nodes 330, 320, and 335), and a fourth set of nodes FK (nodes 335 and 340). For this example, a reduction operation is performed that removes short sequences AB, DI, and FK from the set of short sequences because short sequences AB, DI, and FK are subpaths of the short paths AB, DIN, and FKOP, respectively, in the set of short paths.

Figure 9:
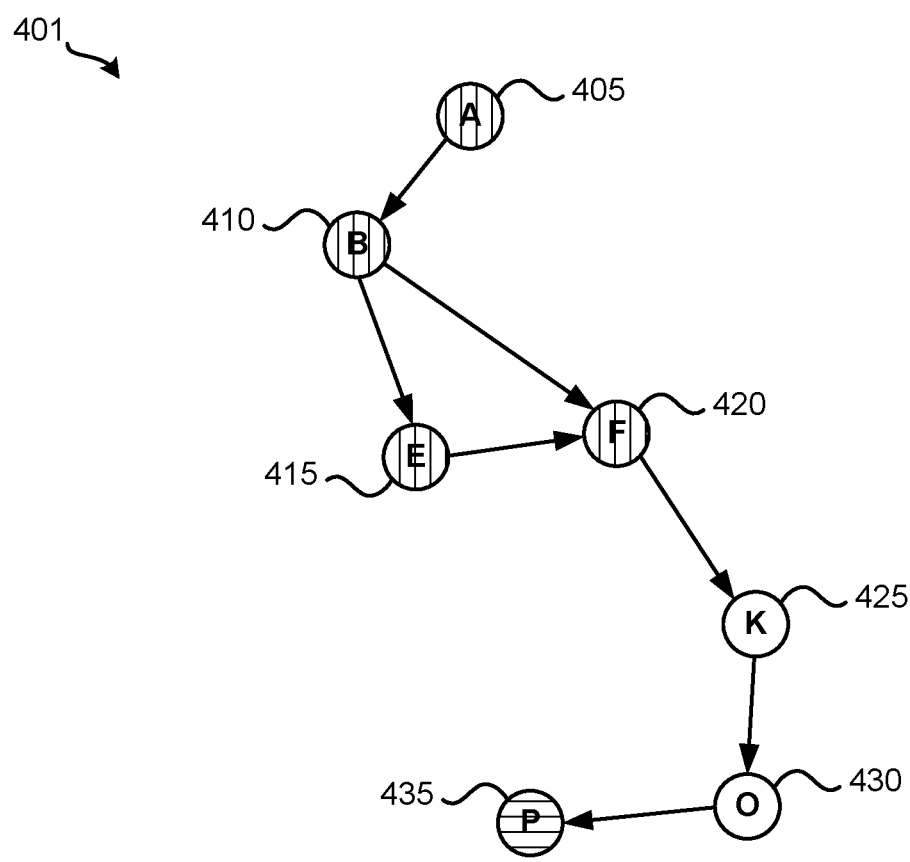
FIG. 9 illustrates short paths and short sequences for the call graph illustrated in FIG. 4 according to some embodiments.
Figure 10:
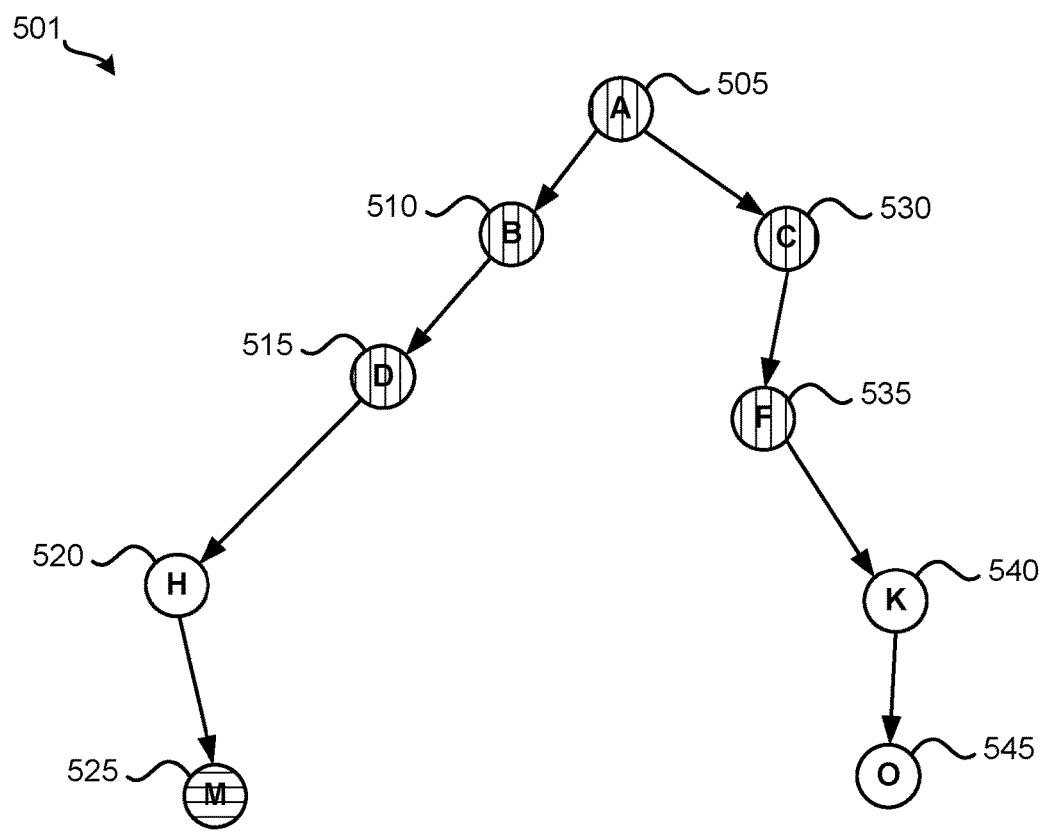
FIG. 10 illustrates short paths and short sequences for the call graph illustrated in FIG. 5 according to some embodiments.

FIG. 9 illustrates short paths and short sequences for the call graph illustrated in FIG. 4 according to some embodiments. As shown, call graph 401 is divided into short paths AB, BE, EF, BF, and FKOP. The short sequences for call graph 401 include a first set of nodes AB (nodes 405 and 410), a second set of nodes BEF (nodes 410, 415, and 420), and a third set of nodes FK (nodes 420 and 425). In this example, a reduction operation is performed that removes short sequences AB, EF, and FK from the set of short sequences since short sequences AB, EF, and FK are subpaths of the short paths AB, EF, and FKOP, respectively, in the set of short paths. FIG. 10 illustrates short paths and short sequences for the call graph illustrated in FIG. 5 according to some embodiments. As illustrated, call graph 501 is divided into short paths AB, AC, BD, DHM, CF, and FKO. The short sequences for call graph 501 include a first set of nodes ABC (nodes 505, 510, and 530), a second set of nodes BD (nodes 510 and 515), a third set of nodes CF (nodes 530 and 535), and a fourth set of nodes FK (nodes 535 and 540). For this example, a reduction operation is performed that removes short sequences BD, DH, CF, and FK from the set of short sequences because short sequences BD, DH, CF, and FK are subpaths of the short paths BD, DHM, CF, and FKO, respectively, in the set of short paths.

Once coverage engine 125 determines the short paths and short sequences for each call graphs in the set of call graphs, coverage engine 125 determines a subset of a set of test cases (e.g., a minimum number of the set of test cases) executed on an application 105 that provides sufficient coverage of the function in the set of test cases based on the short paths and short sequences determined for the set of call graphs. In some embodiments, coverage engine 125 determines the subset of the set of test cases by first determining a set of short paths that each can lead to or includes the node representing the function (also referred to as a target set of short path). Next, coverage engine 125 determines a set of short sequences that includes a particular node that represents the function in the set of test cases for which the minimum number of test cases in the set of test cases is requested and one or more nodes that the particular node calls (also referred to as a target set of short sequences). Coverage engine 125 then determines a test case in the set of test cases that includes (e.g., "covers") the most number of short paths and/or short sequences in the target sets of short paths and short sequences and includes the determined test case in the subset of the set of test cases. Next, coverage engine 125 iteratively selects a test case from the remaining test cases in the set of test cases that includes short paths and/or short sequences that cover the most number of remaining short paths and/or short sequences in the target sets of short paths and short sequences not covered by the test cases in the subset of the set of test cases until the test cases in the subset of the set of test cases cover the target sets of short paths and short sequences. In some embodiments, coverage engine 125 can perform a reduction operation that removes a particular test case from the subset of the set of test cases if removal of the particular test case from the subset of the set of test cases does not impact the coverage provide by the subset of the set of test cases. That is, the particular test case is removed if the subset of the set of test cases still provides coverage of the target sets of short paths and short sequences upon removal of the particular test case.

Referring to FIGS. 7-10 as an example, assume that coverage engine 125 received a request to determine a subset of the set of Test Cases 1-4 executed on an application 105 that provides sufficient coverage of function B in Test Cases 1-4. The target set of short paths in this example includes the short paths AB, BD, BE, and BF. The target set of short sequences in this example includes the short sequences BDE and BEF. In this case, Test Cases 2 and 3 both have the most number of short paths and/or short sequences that cover the target set of short paths and short sequences. Specifically, Test Case 2 has four short paths/short sequences that cover the target set of short paths and short sequences: AB, BD, BE, and BDE and Test Case also has four short paths/short sequences that cover the target set of short paths and short sequences: AB, BE, BF, and BEF. In such a case, one of the test cases is randomly selected. In this example, Test Case 3 is selected and included in the subset of the set of Test Cases 1-4. Next, Test Case 2 is selected from the remaining Test Cases 1, 2, and 4 because Test Case 2 includes the most number of remaining short paths and/or short sequences in the target sets of short paths and short sequences not covered by the test cases in the subset of the set of test cases. In particular, Test Case 2 includes short paths/short sequences BD and BDE, which cover the remaining short paths and/or short sequences BD and BDE in the target sets of short paths and short sequences not covered by the Test Case 1. As such, Test Case 2 is included in the subset of the set of Test Cases 1-4. For this example, when a reduction operation is performed, no test cases are removed from the subset of the set of Test Cases 1-4 since removal of either Test Case 2 or Test Case 3 results in loss of coverage of the target sets of short paths and short sequences.

Figure 11:
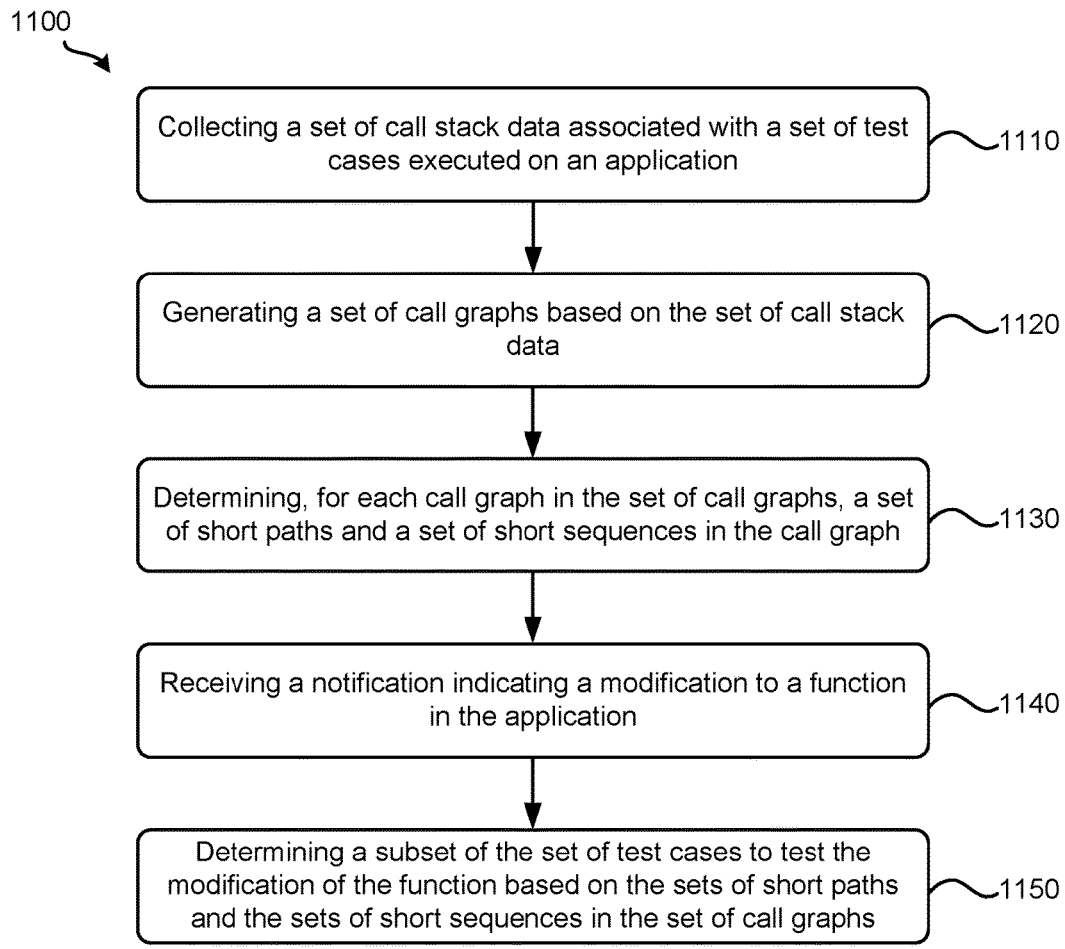
FIG. 11 illustrates a process for determining coverage of a function in a set of test cases according to some embodiments.

FIG. 11 illustrates a process 1100 for determining coverage of a function in a set of test cases according to some embodiments. In some embodiments, system 100 performs process 1100. Process 1100 starts by collecting, at 1110, a set of call stack data associated with a set of test cases executed on an application. Referring to FIG. 1 as an example, call stack data collector 115 may collect the set of call stack data associated with the set of test cases executed on an application 105 in response to requests from testing manager 110 when testing manager 110 was performing the set of test cases on the application 105. Call stack data collector 115 can store the set of call stack data in call stack data storage 135.

Next, process 1100 generates, at 1120, a set of call graphs based on the set of call stack data. Referring to FIG. 1 as an example, call graph manager 120 may generate the set of call graphs based on the set of call stack data collected by call stack data collector 115. Referring to FIGS. 2-5 as an example, call graph manager 120 can generate call graphs 201, 301, 401, and 501 based on the sets of call stack data 200, 300, 400, and 500, respectively.

Process 1100 then determines, at 1130, for each call graph in the set of call graphs, a set of short paths and a set of short sequences in the call graph. Referring to FIG. 1 as an example, coverage engine 125 may determine, for each call graph in the set of call graphs, the set of short paths and the set of short sequences in the call graph in response to a request from testing manager 110. In some embodiments, process 1100 determines the set of short paths and the set of short sequences for a call graph based on determined switch nodes and edge nodes in a full call graph of the set of call graphs associated with the set of test cases. Referring to FIGS. 2-6 as an example, full call graph 600 shown in FIG. 6B illustrates determined switch nodes and edge nodes in a full call graph of the call graphs 201, 301, 401, and 501. Continuing with the example, the short paths and short sequences of call graphs 201, 301, 401, and 501 based on the switch nodes and edge nodes in full call graph 600 are illustrated in FIGS. 7-10, respectively.

Next, process 1100 receives, at 1140, a notification indicating a modification to a function in the application. Referring to FIG. 1 as an example, testing manager 110 may receive the notification indicating a modification to a function in an application 105. Testing manager 110 may also receive a request to determine a minimum number of test cases in the set of test cases that provides sufficient coverage of the modified function in the set of test cases. Finally, process 1100 determines, at 1150, a subset of the set of test cases to test the modification of the function based on the sets of short paths and the sets of short sequences in the set of call graphs. Referring to FIGS. 6-10, process 1100 determines the subset of the set of test cases in the manner described above by reference to the modification of function B in full call graph 600.

Figure 12:
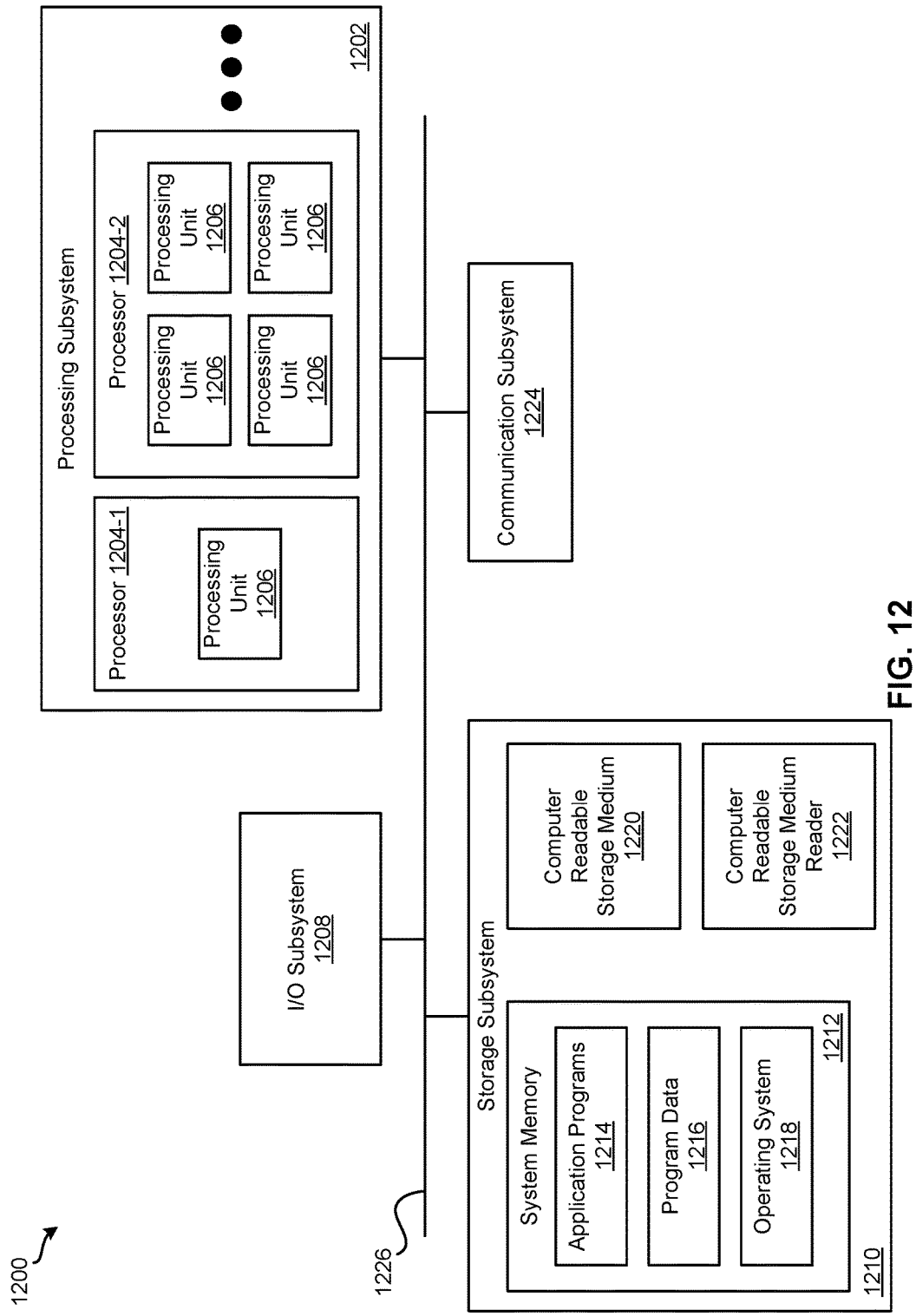
FIG. 12 illustrates an exemplary computer system, in which various embodiments may be implemented.

FIG. 12 illustrates an exemplary computer system 1200 for implementing various embodiments described above. For example, computer system 1200 may be used to implement system 100. Computer system 1200 may be a desktop computer, a laptop, a server computer, or any other type of computer system or combination thereof. Some or all elements of applications 105a-n, testing manager 110, call stack data collector 115, call graph manager 120, and coverage engine 125, or combinations thereof can be included or implemented in computer system 1200. In addition, computer system 1200 can implement many of the operations, methods, and/or processes described above (e.g., process 1100). As shown in FIG. 12, computer system 1200 includes processing subsystem 1202, which communicates, via bus subsystem 1226, with input/output (I/O) subsystem 1208, storage subsystem 1210 and communication subsystem 1224.

Bus subsystem 1226 is configured to facilitate communication among the various components and subsystems of computer system 1200. While bus subsystem 1226 is illustrated in FIG. 12 as a single bus, one of ordinary skill in the art will understand that bus subsystem 1226 may be implemented as multiple buses. Bus subsystem 1226 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1202, which can be implemented as one or more integrated circuits (e.g., a conventional microprocessor or microcontroller), controls the operation of computer system 1200. Processing subsystem 1202 may include one or more processors 1204. Each processor 1204 may include one processing unit 1206 (e.g., a single core processor such as processor 1204-1) or several processing units 1206 (e.g., a multicore processor such as processor 1204-2). In some embodiments, processors 1204 of processing subsystem 1202 may be implemented as independent processors while, in other embodiments, processors 1204 of processing subsystem 1202 may be implemented as multiple processors integrate into a single chip or multiple chips. Still, in some embodiments, processors 1204 of processing subsystem 1202 may be implemented as a combination of independent processors and multiple processors integrated into a single chip or multiple chips.

In some embodiments, processing subsystem 1202 can execute a variety of programs or processes in response to program code and can maintain multiple concurrently executing programs or processes. At any given time, some or all of the program code to be executed can reside in processing subsystem 1202 and/or in storage subsystem 1210. Through suitable programming, processing subsystem 1202 can provide various functionalities, such as the functionalities described above by reference to process 1100, etc.

I/O subsystem 1208 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1200 to a user or another device (e.g., a printer).

As illustrated in FIG. 12, storage subsystem 1210 includes system memory 1212, computer-readable storage medium 1220, and computer-readable storage medium reader 1222. System memory 1212 may be configured to store software in the form of program instructions that are loadable and executable by processing subsystem 1202 as well as data generated during the execution of program instructions. In some embodiments, system memory 1212 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1212 may include different types of memory, such as static random access memory (SRAM) and/or dynamic random access memory (DRAM). System memory 1212 may include a basic input/output system (BIOS), in some embodiments, that is configured to store basic routines to facilitate transferring information between elements within computer system 1200 (e.g., during start-up). Such a BIOS may be stored in ROM (e.g., a ROM chip), flash memory, or any other type of memory that may be configured to store the BIOS.

As shown in FIG. 12, system memory 1212 includes application programs 1214 (e.g., applications 105a-n), program data 1216, and operating system (OS) 1218. OS 1218 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1220 may be a non-transitory computer-readable medium configured to store software (e.g., programs, code modules, data constructs, instructions, etc.). Many of the components (e.g., applications 105a-n, testing manager 110, call stack data collector 115, call graph manager 120, and coverage engine 125) and/or processes (e.g., process 1100) described above may be implemented as software that when executed by a processor or processing unit (e.g., a processor or processing unit of processing subsystem 1202) performs the operations of such components and/or processes. Storage subsystem 1210 may also store data used for, or generated during, the execution of the software.

Storage subsystem 1210 may also include computer-readable storage medium reader 1222 that is configured to communicate with computer-readable storage medium 1220. Together and, optionally, in combination with system memory 1212, computer-readable storage medium 1220 may comprehensively represent remote, local, fixed, and/or removable storage devices plus storage media for temporarily and/or more permanently containing, storing, transmitting, and retrieving computer-readable information.

Computer-readable storage medium 1220 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1224 serves as an interface for receiving data from, and transmitting data to, other devices, computer systems, and networks. For example, communication subsystem 1224 may allow computer system 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1224 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1224 may provide components configured for wired communication (e.g., Ethernet) in addition to or instead of components configured for wireless communication.

One of ordinary skill in the art will realize that the architecture shown in FIG. 12 is only an example architecture of computer system 1200, and that computer system 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
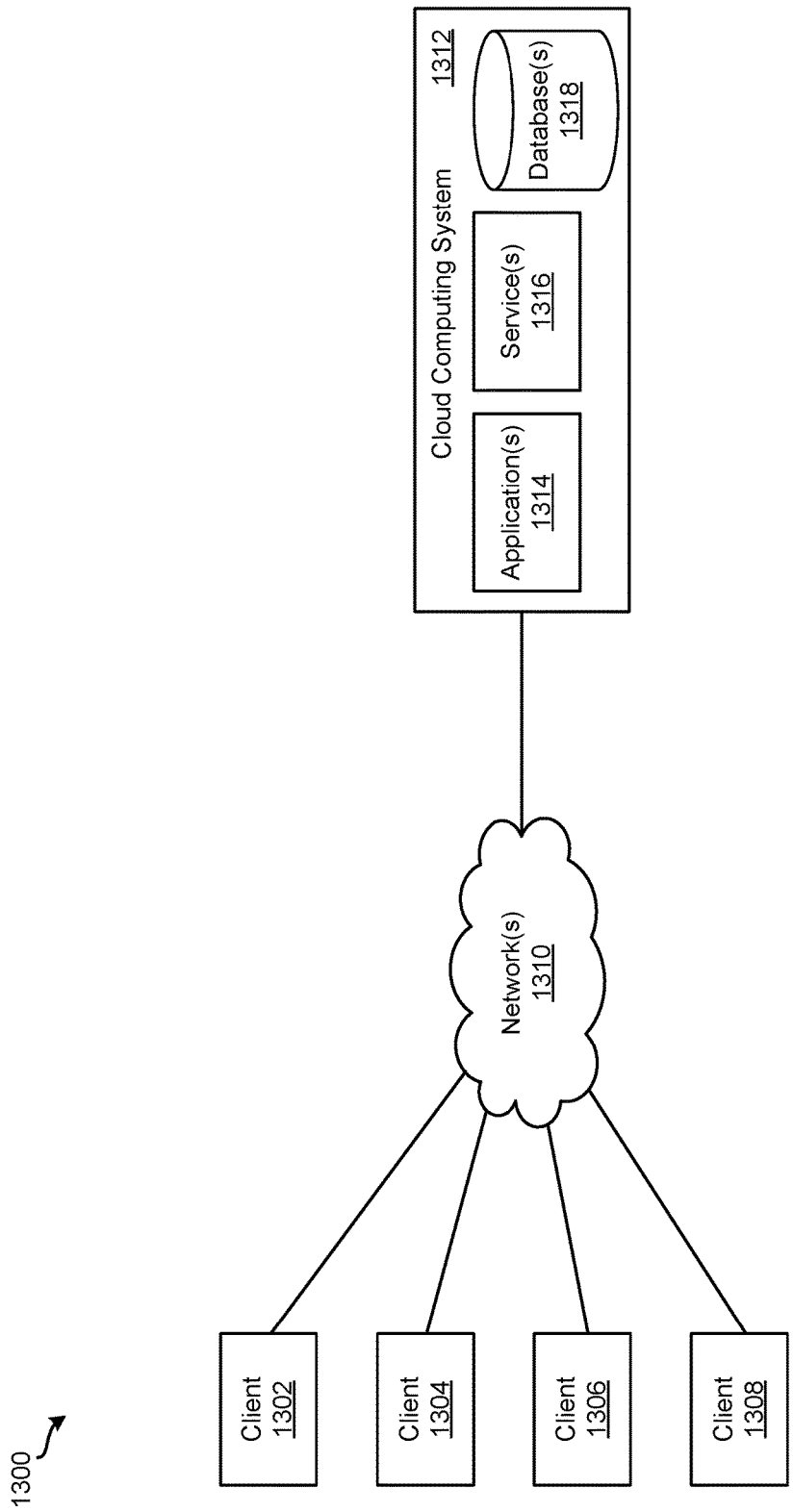
FIG. 13 illustrates system for implementing various embodiments described above.

FIG. 13 illustrates an exemplary system 1300 for implementing various embodiments described above. For example, cloud computing system 1312 of system 1300 may be used to implement system 100. As shown, system 1300 includes client devices 1302-1308, one or more networks 1310, and cloud computing system 1312. Cloud computing system 1312 is configured to provide resources and data to client devices 1302-1308 via networks 1310. In some embodiments, cloud computing system 1300 provides resources to any number of different users (e.g., customers, tenants, organizations, etc.). Cloud computing system 1312 may be implemented by one or more computer systems (e.g., servers), virtual machines operating on a computer system, or a combination thereof.

As shown, cloud computing system 1312 includes one or more applications 1314, one or more services 1316, and one or more databases 1318. Cloud computing system 1300 may provide applications 1314, services 1316, and databases 1318 to any number of different customers in a self-service, subscription-based, elastically scalable, reliable, highly available, and secure manner.

In some embodiments, cloud computing system 1300 may be adapted to automatically provision, manage, and track a customer's subscriptions to services offered by cloud computing system 1300. Cloud computing system 1300 may provide cloud services via different deployment models. For example, cloud services may be provided under a public cloud model in which cloud computing system 1300 is owned by an organization selling cloud services and the cloud services are made available to the general public or different industry enterprises. As another example, cloud services may be provided under a private cloud model in which cloud computing system 1300 is operated solely for a single organization and may provide cloud services for one or more entities within the organization. The cloud services may also be provided under a community cloud model in which cloud computing system 1300 and the cloud services provided by cloud computing system 1300 are shared by several organizations in a related community. The cloud services may also be provided under a hybrid cloud model, which is a combination of two or more of the aforementioned different models.

In some instances, any one of applications 1314, services 1316, and databases 1318 made available to client devices 1302-1308 via networks 1310 from cloud computing system 1300 is referred to as a "cloud service." Typically, servers and systems that make up cloud computing system 1300 are different from the on-premises servers and systems of a customer. For example, cloud computing system 1300 may host an application and a user of one of client devices 1302-1308 may order and use the application via networks 1310.

Applications 1314 may include software applications that are configured to execute on cloud computing system 1312 (e.g., a computer system or a virtual machine operating on a computer system) and be accessed, controlled, managed, etc. via client devices 1302-1308. In some embodiments, applications 1314 may include server applications and/or mid-tier applications (e.g., HTTP (hypertext transport protocol) server applications, FTP (file transfer protocol) server applications, CGI (common gateway interface) server applications, JAVA server applications, etc.). Services 1316 are software components, modules, application, etc. that are configured to execute on cloud computing system 1312 and provide functionalities to client devices 1302-1308 via networks 1310. Services 1316 may be web-based services or on-demand cloud services.

Databases 1318 are configured to store and/or manage data that is accessed by applications 1314, services 1316, and/or client devices 1302-1308. For instance, storages 130-140 may be stored in databases 1318. Databases 1318 may reside on a non-transitory storage medium local to (and/or resident in) cloud computing system 1312, in a storage-area network (SAN), on a non-transitory storage medium local located remotely from cloud computing system 1312. In some embodiments, databases 1318 may include relational databases that are managed by a relational database management system (RDBMS). Databases 1318 may be a column-oriented databases, row-oriented databases, or a combination thereof. In some embodiments, some or all of databases 1318 are in-memory databases. That is, in some such embodiments, data for databases 1318 are stored and managed in memory (e.g., random access memory (RAM)).

Client devices 1302-1308 are configured to execute and operate a client application (e.g., a web browser, a proprietary client application, etc.) that communicates with applications 1314, services 1316, and/or databases 1318 via networks 1310. This way, client devices 1302-1308 may access the various functionalities provided by applications 1314, services 1316, and databases 1318 while applications 1314, services 1316, and databases 1318 are operating (e.g., hosted) on cloud computing system 1300. Client devices 1302-1308 may be computer system 1200, as described above by reference to FIG. 12. Although system 1300 is shown with four client devices, any number of client devices may be supported.

Networks 1310 may be any type of network configured to facilitate data communications among client devices 1302-1308 and cloud computing system 1312 using any of a variety of network protocols. Networks 1310 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

collecting a set of call stack data associated with a set of test cases executed on an application;

generating a set of call graphs based on the set of call stack data, each call graph in the set of call graphs comprising a set of nodes representing a set of functions in the application executed in the corresponding test case in the set of test cases;

generating a full call graph based on the set of call graphs, the full call graph comprising a plurality of nodes representing the sets of functions executed by the application during the execution of the set of test cases on the application;

determining a set of switch nodes and a set of edge nodes in the plurality of nodes of the full call graph, wherein each switch node in the set of switch nodes calls two or more other nodes in the full call graph, wherein each edge node in the set of edge nodes does not call any nodes in the full call graph;

determining, for each call graph in the set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;

receiving a notification indicating a modification to a function in the sets of functions of the application;

determining a subset of the set of test cases to test the modification to the function based on the sets of short paths and the sets of short sequences in the set of call graphs; and executing the subset of the set of test cases on a version of the application that includes the modified function.

2. The non-transitory machine-readable medium of claim 1, wherein determining the subset of the set of test cases comprises:

determining a target set of short paths;

determining a target set of short sequences; and selecting a test case from the set of test cases to include in the subset of the set of test cases, the selected test case having a call graph that includes the most number of short paths and short sequences in the target set of short paths and the target set of short sequences.

3. The non-transitory machine-readable medium of claim 2, wherein determining the subset of the set of test cases further comprises iteratively selecting a test case from the remaining test cases in the set of test cases to include in the subset of the set of test cases, the selected test case having a call graph that includes short paths and short sequences that cover the most number of remaining short paths and short sequences in the target sets of short paths and short sequences not covered by test cases in the subset of the set of test cases until the test cases in the subset of the set of test cases cover the target sets of short paths and short sequences.

4. The non-transitory machine-readable medium of claim 1, wherein determining, for each call graph in the set of call graphs, the set of short paths and the set of short sequences in the call graph comprises performing a reduction operation that removes short sequences from the set of short sequences of a call graph that are subpaths of short paths in the set of short paths of the call graph.

5. The non-transitory machine-readable medium of claim 1, wherein the program further comprises a set of instructions for performing a reduction operation that removes a particular test case from the subset of the set of test cases when removal of the particular test case from the subset of the set of test cases does not impact the coverage provide by the subset of the set of test cases on the application.

6. The non-transitory machine-readable medium of claim 1, wherein the set of call stack data associated with the set of test cases executed on the application is a first set of call stack data associated with the set of test cases executed on a first application, wherein the set of call graphs is a first set of call graphs, wherein the full call graph comprising the plurality of nodes is a first full call graph comprising a first plurality of nodes, wherein the set of switch nodes is a first set of switch nodes, wherein the set of edge nodes is a first set of edge nodes, wherein the notification is a first notification, wherein the subset of the set of test cases is a first subset of the set of test cases, wherein the program further comprises sets of instructions for:

collecting a second set of call stack data associated with the set of test cases executed on a second application;

generating a second set of call graphs based on the second set of call stack data, each call graph in the second set of call graphs comprising a set of nodes representing a set of functions in the second application executed in the corresponding test case in the set of test cases;

generating a second full call graph based on the second set of call graphs, the second full call graph comprising a second plurality of nodes representing the sets of functions executed by the second application during the execution of the set of test cases on the second application;

determining a second set of switch nodes and a second set of edge nodes in the second plurality of nodes of the second full call graph, wherein each switch node in the second set of switch nodes calls two or more other nodes in the second full call graph, wherein each edge node in the second set of edge nodes does not call any nodes in the second full call graph;

determining, for each call graph in the second set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;

receiving a second notification indicating a modification to a function in the sets of functions of the second application;

determining a second subset of the set of test cases to test the modification to the function based on the sets of short paths and the sets of short sequences in the second set of call graphs; and performing the second subset of the set of test cases on a version of the second application that includes the modified function.

7. The non-transitory machine-readable medium of claim 6, wherein the program further comprise a set of instructions for performing a reduction operation that removes a particular test case from the second subset of the set of test cases when removal of the particular test case from the second subset of the set of test cases does not impact the coverage provide by the second subset of the set of test cases on the second application.

8. A method comprising:

collecting a set of call stack data associated with a set of test cases executed on an application;

generating a set of call graphs based on the set of call stack data, each call graph in the set of call graphs comprising a set of nodes representing a set of functions in the application executed in the corresponding test case in the set of test cases;

generating a full call graph based on the set of call graphs, the full call graph comprising a plurality of nodes representing the sets of functions executed by the application during the execution of the set of test cases on the application;

determining a set of switch nodes and a set of edge nodes in the plurality of nodes of the full call graph, wherein each switch node in the set of switch nodes calls two or more other nodes in the full call graph, wherein each edge node in the set of edge nodes does not call any nodes in the full call graph;

determining, for each call graph in the set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;

receiving a notification indicating a modification to a function in the sets of functions of the application;

determining a subset of the set of test cases to test the modification to the function based on the sets of short paths and the sets of short sequences in the set of call graphs; and executing the subset of the set of test cases on a version of the application that includes the modified function.

9. The method of claim 8, wherein determining the subset of the set of test cases comprises:

determining a target set of short paths;

determining a target set of short sequences; and selecting a test case from the set of test cases to include in the subset of the set of test cases, the selected test case having a call graph that includes the most number of short paths and short sequences in the target set of short paths and the target set of short sequences.

10. The method of claim 9, wherein determining the subset of the set of test cases further comprises iteratively selecting a test case from the remaining test cases in the set of test cases to include in the subset of the set of test cases, the selected test case having a call graph that includes short paths and short sequences that cover the most number of remaining short paths and short sequences in the target sets of short paths and short sequences not covered by test cases in the subset of the set of test cases until the test cases in the subset of the set of test cases cover the target sets of short paths and short sequences.

11. The method of claim 8, wherein determining, for each call graph in the set of call graphs, the set of short paths and the set of short sequences in the call graph comprises performing a reduction operation that removes short sequences from the set of short sequences of a call graph that are subpaths of short paths in the set of short paths of the call graph.

12. The method of claim 8 further comprising performing a reduction operation that removes a particular test case from the subset of the set of test cases when removal of the particular test case from the subset of the set of test cases does not impact the coverage provide by the subset of the set of test cases on the application.

13. The method of claim 8, wherein the path the set of call stack data associated with the set of test cases executed on the application is a first set of call stack data associated with the set of test cases executed on a first application, wherein the set of call graphs is a first set of call graphs, wherein the full call graph comprising the plurality of nodes is a first full call graph comprising a first plurality of nodes, wherein the set of switch nodes is a first set of switch nodes, wherein the set of edge nodes is a first set of edge nodes, wherein the notification is a first notification, wherein the subset of the set of test cases is a first subset of the set of test cases, wherein the method further comprises:

collecting a second set of call stack data associated with the set of test cases executed on a second application;

generating a second set of call graphs based on the second set of call stack data, each call graph in the second set of call graphs comprising a set of nodes representing a set of functions in the second application executed in the corresponding test case in the set of test cases;

generating a second full call graph based on the second set of call graphs, the second full call graph comprising a second plurality of nodes representing the sets of functions executed by the second application during the execution of the set of test cases on the second application;

determining a second set of switch nodes and a second set of edge nodes in the second plurality of nodes of the second full call graph, wherein each switch node in the second set of switch nodes calls two or more other nodes in the second full call graph, wherein each edge node in the second set of edge nodes does not call any nodes in the second full call graph;

determining, for each call graph in the second set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;

receiving a second notification indicating a modification to a function in the sets of functions of the second application;

determining a second subset of the set of test cases to test the modification to the function based on the sets of short paths and the sets of short sequences in the second set of call graphs; and performing the second subset of the set of test cases on a version of the second application that includes the modified function.

14. The method of claim 8 further comprising performing a reduction operation that removes a particular test case from the second subset of the set of test cases when removal of the particular test case from the second subset of the set of test cases does not impact the coverage provide by the second subset of the set of test cases on the second application.

15. A system comprising:
a set of processing units; and
a non-transitory computer-readable medium storing instructions that when executed by at least one processing unit in the set of processing units cause the at least one processing unit to:
collect a set of call stack data associated with a set of test cases executed on an application;
generate a set of call graphs based on the set of call stack data, each call graph in the set of call graphs comprising a set of nodes representing a set of functions in the application executed in the corresponding test case in the set of test cases;
generate a full call graph based on the set of call graphs, the full call graph comprising a plurality of nodes representing the sets of functions executed by the application during the execution of the set of test cases on the application;

determine a set of switch nodes and a set of edge nodes in the plurality of nodes of the full call graph, wherein each switch node in the set of switch nodes calls two or more other nodes in the full call graph, wherein each edge node in the set of edge nodes does not call any nodes in the full call graph;

determine, for each call graph in the set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;

receive a notification indicating a modification to a function in the sets of functions of the application;

determine a subset of the set of test cases to test the modification to the function based on the sets of short paths and the sets of short sequences in the set of call graphs; and execute the subset of the set of test cases on a version of the application that includes the modified function.

16. The system of claim 15, wherein determining the subset of the set of test cases comprises:
determining a target set of short paths;
determining a target set of short sequences; and
selecting a test case from the set of test cases to include in the subset of the set of test cases, the selected test case having a call graph that includes the most number of short paths and short sequences in the target set of short paths and the target set of short sequences.

17. The system of claim 16, wherein determining the subset of the set of test cases further comprises iteratively selecting a test case from the remaining test cases in the set of test cases to include in the subset of the set of test cases, the selected test case having a call graph that includes short paths and short sequences that cover the most number of remaining short paths and short sequences in the target sets of short paths and short sequences not covered by test cases in the subset of the set of test cases until the test cases in the subset of the set of test cases cover the target sets of short paths and short sequences.

18. The system of claim 15, wherein determining, for each call graph in the set of call graphs, the set of short paths and the set of short sequences in the call graph comprises performing a reduction operation that removes short sequences from the set of short sequences of a call graph that are subpaths of short paths in the set of short paths of the call graph.

19. The system of claim 15, wherein the instructions further cause the at least one processing unit to perform a reduction operation that removes a particular test case from the subset of the set of test cases when removal of the particular test case from the subset of the set of test cases does not impact the coverage provide by the subset of the set of test cases on the application.

20. The system of claim 15, wherein the set of call stack data associated with the set of test cases executed on the application is a first set of call stack data associated with the set of test cases executed on a first application, wherein the set of call graphs is a first set of call graphs, wherein the full call graph comprising the plurality of nodes is a first full call graph comprising a first plurality of nodes, wherein the set of switch nodes is a first set of switch nodes, wherein the set of edge nodes is a first set of edge nodes, wherein the notification is a first notification, wherein the subset of the set of test cases is a first subset of the set of test cases, the instructions further cause the at least one processing unit to:
collect a second set of call stack data associated with the set of test cases executed on a second application;
generate a second set of call graphs based on the second set of call stack data, each call graph in the second set of call graphs comprising a set of nodes representing a set of functions in the second application executed in the corresponding test case in the set of test cases;
generate a second full call graph based on the second set of call graphs, the second full call graph comprising a second plurality of nodes representing the sets of functions executed by the second application during the execution of the set of test cases on the second application;
determine a second set of switch nodes and a second set of edge nodes in the second plurality of nodes of the second full call graph, wherein each switch node in the second set of switch nodes calls two or more other nodes in the second full call graph, wherein each edge node in the second set of edge nodes does not call any nodes in the second full call graph;
determine, for each call graph in the second set of call graphs, a set of short paths and a set of short sequences in the call graph, wherein each short path in the set of short paths comprises a path in the call graph that starts at a switch node in the call graph and ends at a first switch node in the call graph along the path, a first edge node in the call graph along the path, or a node in the call graph at an end of the path, wherein each short sequence in the set of short sequences comprises a switch node in the call graph and a set of nodes in the call graph that the switch node calls;
receive a second notification indicating a modification to a function in the sets of functions of the second application;
determine a second subset of the set of test cases to test the modification to the function based on the sets of short paths and the sets of short sequences in the second set of call graphs; and
perform the second subset of the set of test cases on a version of the second application that includes the modified function.

* * * * *